Sept. 13, 1927.

J. CLINTON

FAUCET

Filed April 16, 1925

Inventor.
John Clinton,
By John W. Farley
Atty.

Patented Sept. 13, 1927.

1,642,101

UNITED STATES PATENT OFFICE.

JOHN CLINTON, OF MEMPHIS, TENNESSEE.

FAUCET.

Application filed April 16, 1925. Serial No. 23,449.

My invention relates to faucets and its primary object is to provide, in devices of the type which possess two valved inlets and a common outlet, and a common valve controlling mechanism, means of a simple construction and of positively acting parts and in which the use of springs for the valve is rendered unnecessary.

With this object in view, my invention is embodied in preferable form in the construction and arrangement hereinafter described and illustrated in the accompanying drawings, in which—

Figure 1:
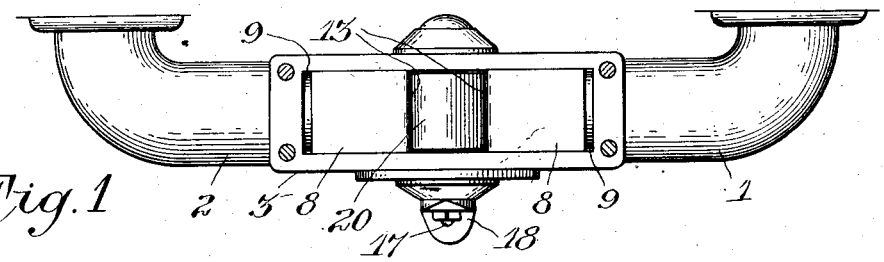
Figure 2:
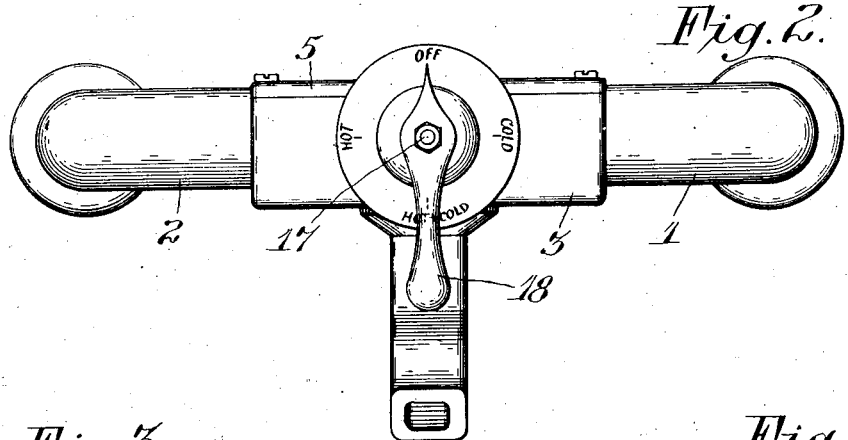
Figure 3:
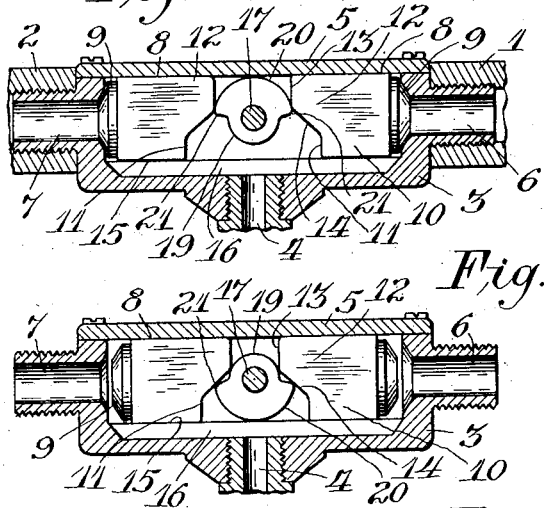
Figure 4:
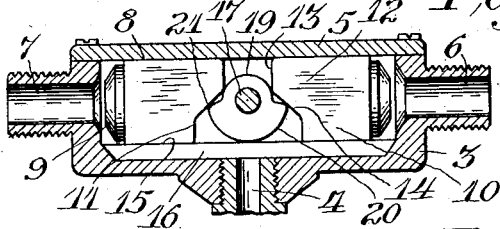
Figure 5:
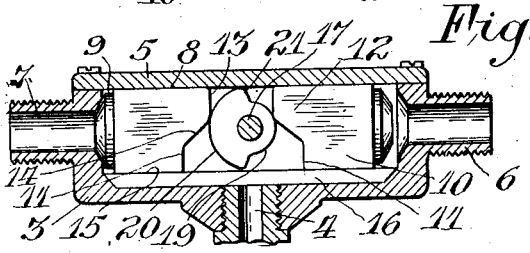

Fig. 1 is a top plan view;

Fig. 2, a front view in elevation;

Fig. 3, a vertical longitudinal section, showing the valves in position to close both inlets;

Fig. 4, a similar view showing both valves open;

Fig. 5, a similar view showing one valve open and the other closed; and

Figure 6:
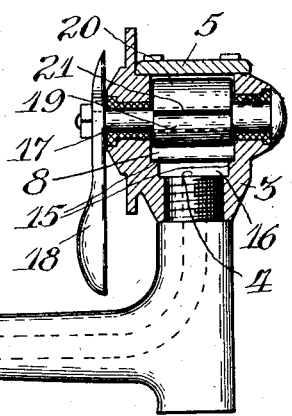

Fig. 6, a vertical section at right angles to Fig. 3.

Referring to the drawings, 1 indicates an inlet pipe communicating with a source of cold water, and 2 an inlet pipe for hot water. A hollow valve casing 3 is threaded into these pipes and is provided with an outlet 4. A cover 5 for the casing is removably secured thereto to give access to the valves and operating means. The pipe extensions 6 and 7 of the casing that are threaded into the inlet pipes are in direct longitudinal or axial prolongation of the bore of the casing.

At their inner ends these extensions 6 and 7 are provided with valve seats with each of which is adapted to engage a sliding valve 8 adapted to close and open the inlets. These valves are identical in construction, and each has a valve head 9, preferably of rubber adapted to engage the seat, and close the inlet and the outer face of which alone receives the constant pressure of the water in the inlet pipe, the force of which moves the valve inward to admission position when the contact of the positive closing means against the inner end of the valve is removed. The valve is provided with a stepped inner end formed by a relatively short or reduced longitudinal section 10, having a perpendicular inner face 11, a relatively elongated section 12, terminating in a perpendicular face 13, with an intermediate inclined face or wall 14 joining the two faces 11 and 13. The valves slide on ledges 15 formed above a longitudinal channel 16 connecting the inlets with the outlet. Between the inner ends of the valves is mounted a rotatable valve operating member fixed on a shaft 17 mounted in the casing walls and which is provided with a handle 18.

This operating member comprises a semi-cylindrical portion 19, and an enlarged or eccentric cam portion 20, with shoulders 21, joining the two parts, at opposite diametrical points.

In the operation of the device, when it is desired to close both inlets, the valve operating member is moved by the handle to the position shown in Fig. 3 in which the enlarged cam portion 20 of the member will be carried against the faces 13 of the longer sections 12 of both valves, thus forcing the latter to their seats and closing both inlets. If it is desired to open both valves so as to mix the hot and cold water, the operating member is moved to the position shown in Fig. 4, in which the cam portion 20 is wholly below the faces 13 and opposite the inclined faces 14 whereupon the pressure of the water alone against the outer faces of the valves will force the latter from their seats and admit water from both inlets to the channel 16 from which it passes to the outlet. To close the hot water inlet and open the cold water inlet, the operating member is adjusted to the position shown in Fig. 5, with the enlarged cam part bearing against the longer section of one valve and the reduced semi-cylindrical part 19 bearing against the inner end of the other valve, leaving the latter free to open.

It will be seen that in this construction, the valves are closed by the direct and positive contact pressure of the operating member. The valves are composed of bodies preferably solid in structure or having closed outer walls which bear equally against the supporting walls and ledges of the casing, thereby insuring the guiding of the valves in their sliding movement without binding. The valves are opened solely by the direct pressure of the incoming water against the faces of the valves, and the use of springs to effect the closing of the valves is rendered unnecessary.

Having thus described my invention, what I claim is:

1. The combination with the adjacent inner ends of slide valves slidably mounted in a valve casing and cooperating with valve seats carried by the casing, of means for seating either or both of said valves, said means comprising a disc rotatably mounted between the adjacent ends of the valves, an arcuately shaped valve engaging surface carried by said disc and extending substantially one hundred and eighty degrees thereby forming oppositely disposed shoulders, an arcuate valve engaging surface of less radius than the first mentioned valve engaging surface and in opposed relation to the first mentioned valve engaging surface, opposed inclined surfaces carried by the valves, said surfaces being disposed in planes whereby the valves are unseated the shoulders will engage said surfaces intermediate their ends, and the reduced arcuate surface will engage the adjacent ends of the valves where said surfaces terminate.

2. The combination with adjacent ends of slide valves having diverging cam surfaces, of a rotatable disc between said valve ends, said disc having a reduced arcuate surface engaging the ends of the valves when in open position, a second arcuate surface carried by the disc of greater radius than the first mentioned arcuate surface, said surfaces being concentric, said surface of greater radius extending substantially one half around the disc thereby forming shoulders, said shoulders engaging the inclined surfaces of the valves when in open position, said adjacent ends of the valves engaging opposite sides of the reduced arcuate surface when the valves are in open position.

In testimony whereof I affix my signature.

JOHN CLINTON.